United States Patent [19]
Frazier

[11] Patent Number: 6,003,580
[45] Date of Patent: Dec. 21, 1999

US006003580A

[54] PLACEMENT APPARATUS FOR THIN FLEXIBLE MEMBERS

[75] Inventor: Michael John Frazier, Waterloo, Wis.

[73] Assignee: Stabon International, Inc., Sun Prairie, Wis.

[21] Appl. No.: 08/536,395

[22] Filed: Sep. 29, 1995

[51] Int. Cl.[6] .................................................. B32B 31/00
[52] U.S. Cl. ......................... 156/521; 156/510; 156/297; 156/453; 156/485; 156/564; 156/567; 156/573; 156/542; 156/350; 156/568; 83/349; 83/342; 83/673; 83/674
[58] Field of Search .................................. 156/521, 510, 156/297, 453, 485, 564, 567, 573, 542, 350, 568, 497, 515; 83/674, 342, 349, 673

[56] References Cited

U.S. PATENT DOCUMENTS

| | | | |
|---|---|---|---|
| 3,765,991 | 10/1973 | Hoffman | 156/521 |
| 4,443,285 | 4/1984 | Roth et al. | 156/215 |
| 4,526,645 | 7/1985 | Malthouse et al. | 156/350 |
| 4,561,928 | 12/1985 | Malthouse | 156/497 |
| 4,726,872 | 2/1988 | Olsen | 156/446 |
| 4,729,811 | 3/1988 | DiFrank | 156/449 |
| 5,188,558 | 2/1993 | Barton et al. | 446/224 |
| 5,344,519 | 9/1994 | Galchefski et al. | 156/456 |
| 5,399,216 | 3/1995 | Galchefski et al. | 156/215 |

*Primary Examiner*—Merrick Dixon
*Attorney, Agent, or Firm*—Fitch, Even, Tabin & Flannery

[57] ABSTRACT

An automated placement of flat valves on a balloon strip. Included is a vacuum platen which receives the free end of a row of valve films. A cutting blade severs a single valve from the film, which is held in place by the vacuum platen. The vacuum platen is then moved through a series of motions for positioning above a heating element which is raised to bond the valve to the balloon strip.

20 Claims, 15 Drawing Sheets

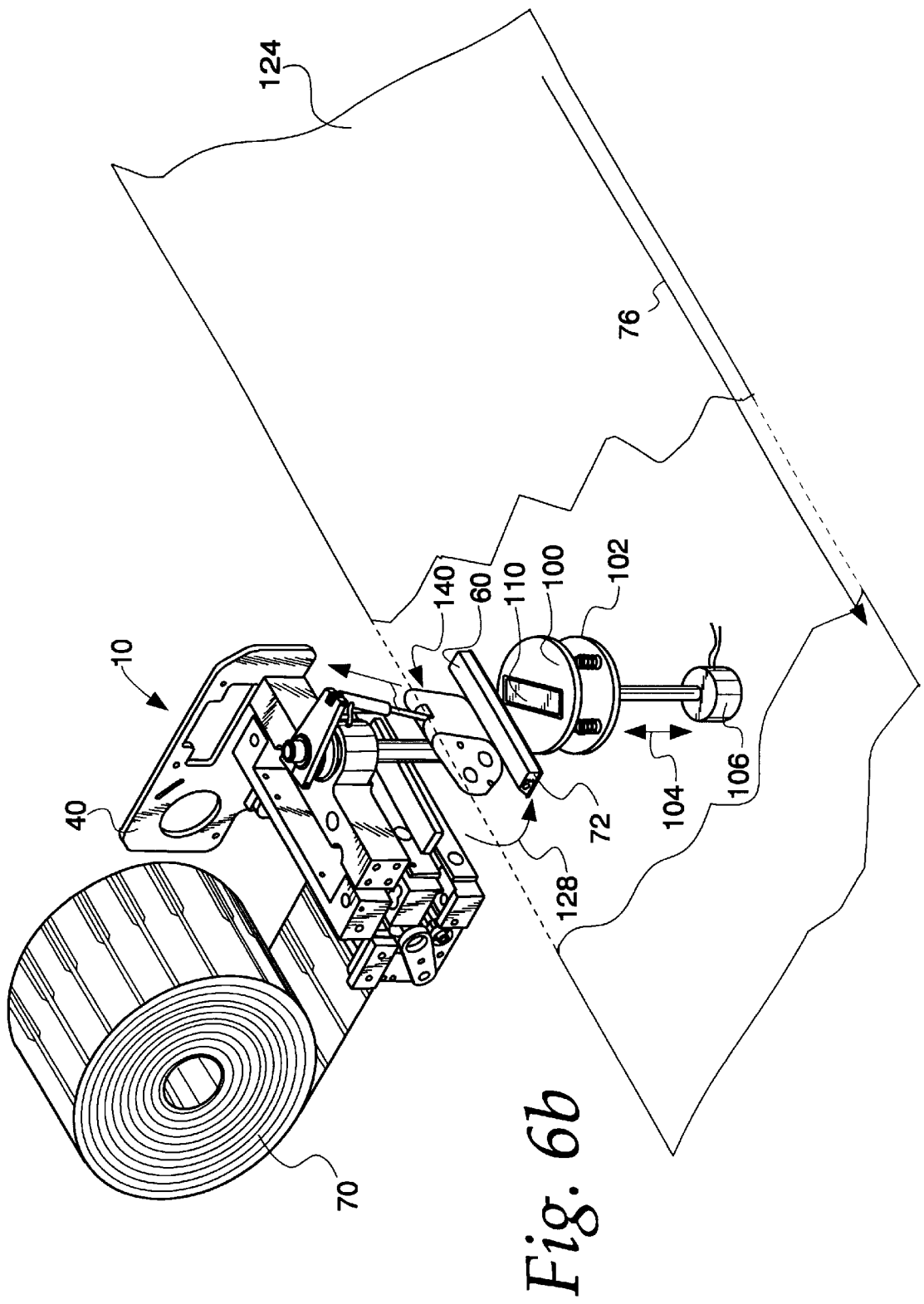

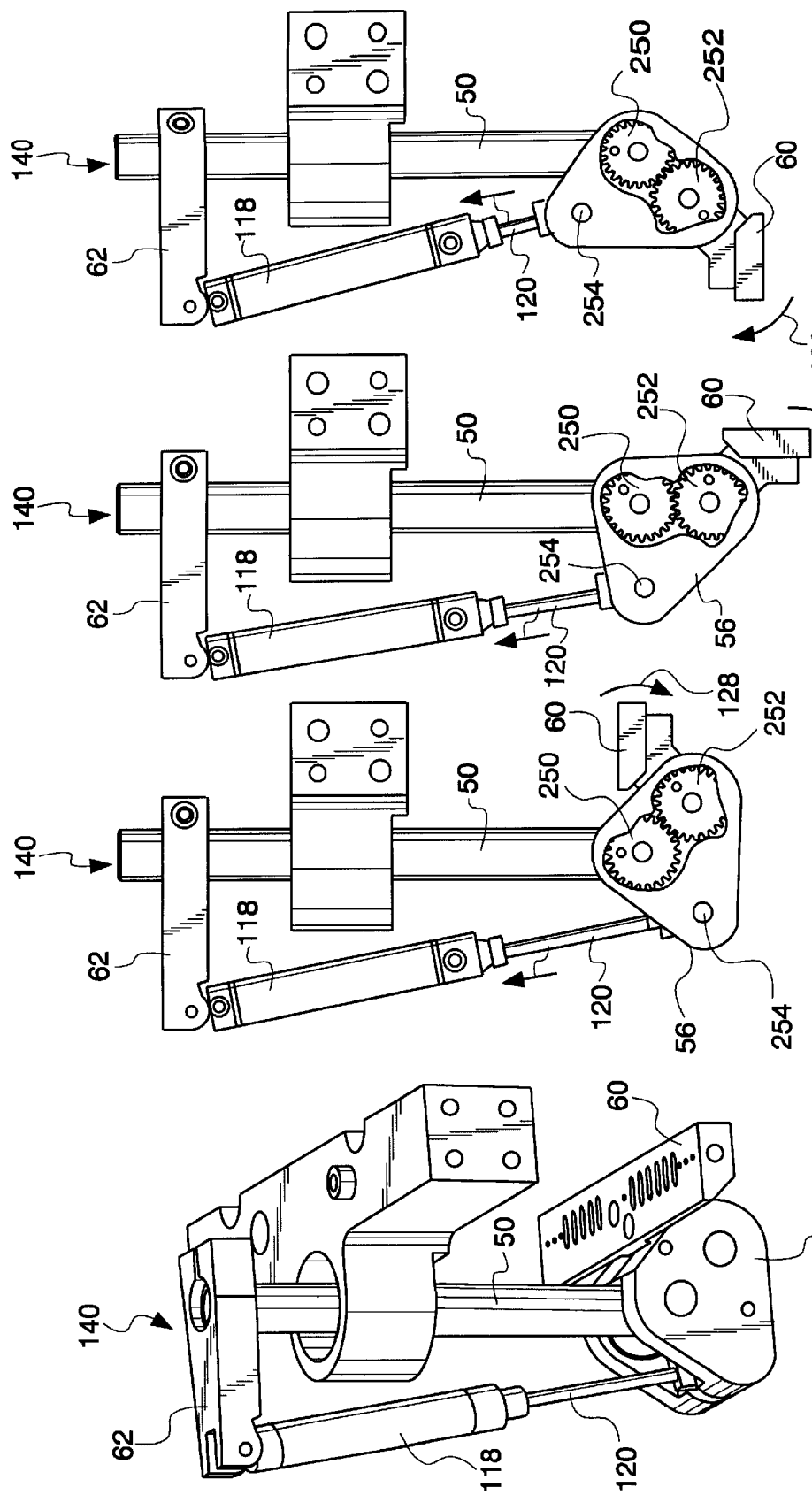

PLACEMENT APPARATUS FOR THIN FLEXIBLE MEMBERS

BACKGROUND OF THE INVENTION

1. Field of the Invention

The present invention pertains to the manufacture of toy balloons, especially toy balloons having self-sealing valves.

2. Description of the Related Art

Toy balloons of the non-latex type are currently produced with valves of the so-called "self-sealing" or "flat", type. Examples of such valves are given in U.S. Pat. Nos. 4,850,912; 4,708,167 and 4,674,532. These types of valves may also be employed in pillows, dunnage or other inflatable articles, in addition to toy balloons. In its simplest form, the valve comprises a flattened hollow tube of readily flexible plastic film. The valve is positioned in the interior of the inflatable article, with the inlet end located adjacent an outer periphery of the article, for easy filling. When filling of the article is desired, gas pressure is introduced into the interior of the article, through the hollow tubular passageway of the valve. As the article approaches its final, inflated state, internal pressure developed within the article compresses the valve. During filling, pressure of the inflating gas easily overcomes the compression pressures within the article. However, when the inflating pressure is removed, internal pressure within the article causes the flat valve to quickly collapse, thus preventing gas from within the article from escaping.

SUMMARY OF THE INVENTION

It is an object of the present invention to provide method and apparatus for assembling commercially important components such as inflatable articles, and in particular for acquiring and placing thin flexible members such as flat valves on webs such as balloon films.

These and other objects of the present invention, which will become apparent from studying the appended description and drawings, are provided in apparatus for acquiring and placing a thin flexible member, comprising:

holding means for holding a roll of thin flexible members joined in a serial succession to form a continuous strip having a free end;

a cutting station adjacent the holding means;

feeding means adjacent the cutting station, for feeding the free end of the strip to the cutting station;

cutting means at the cutting station adjacent the feeding means, for cutting a member at the free end of the strip from the remainder of the strip;

carrier means at the cutting station for supporting the member at the free end of the strip, and for retaining the member after cutting; and carrier mounting means for rotatingly mounting the carrier for movement between a cutting support position for supporting the member at the free end of the strip and a delivery position, remote from the cutting support position, for placing the member in a predefined position.

BRIEF DESCRIPTION OF THE DRAWINGS

FIGS. 6a–6d show subsequent operations of the apparatus of FIG. 5;

FIG. 10 is a perspective view of a shuttle mechanism employed in the apparatus;

FIGS. 11–13 are side elevational views of the shuttle mechanism, shown partly in cross section, in various stages of operation.

DETAILED DESCRIPTION OF THE PREFERRED EMBODIMENTS

Figure 1:
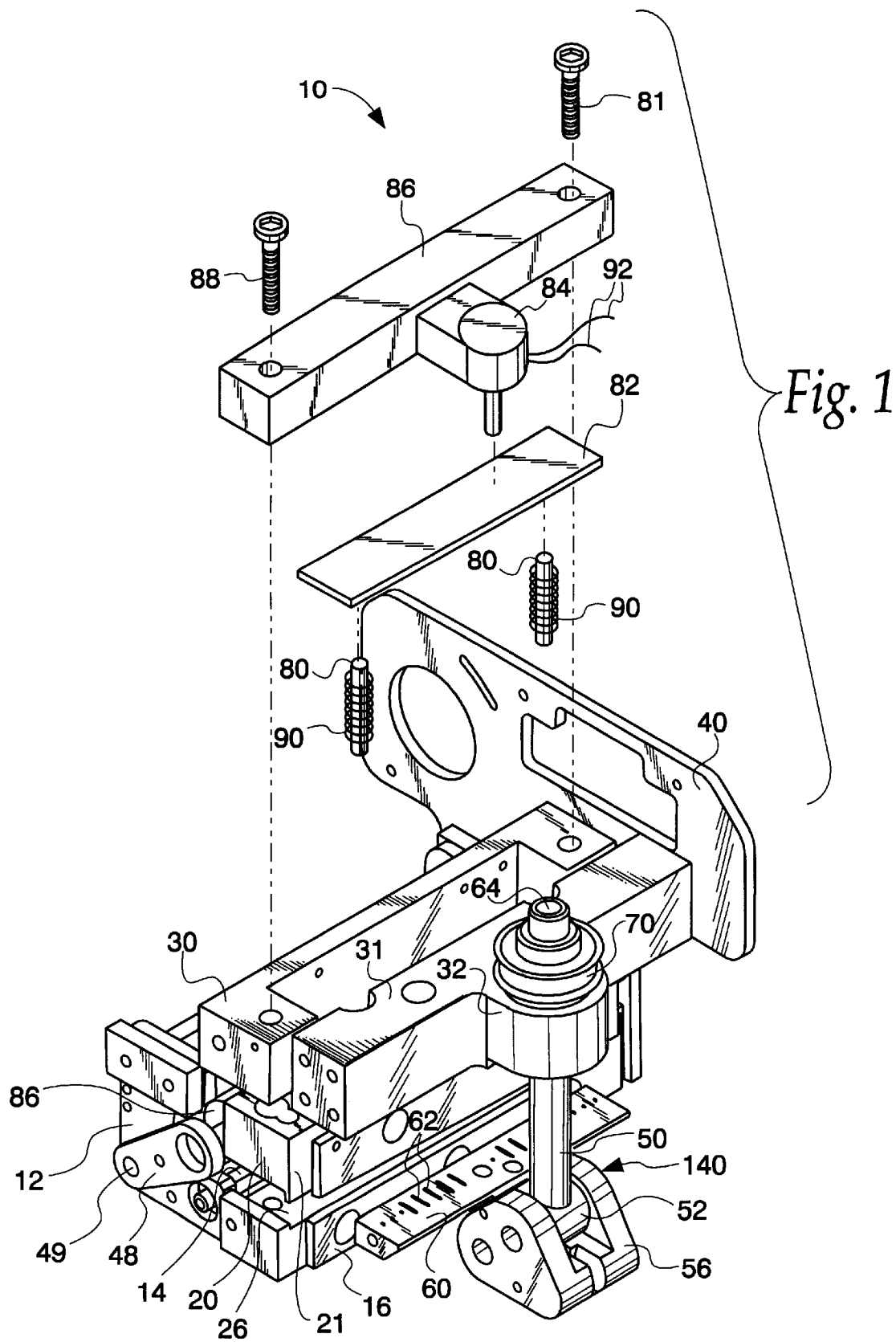
FIG. 1 is a fragmentary exploded perspective view of apparatus according to principles of the present invention.
Figure 2:
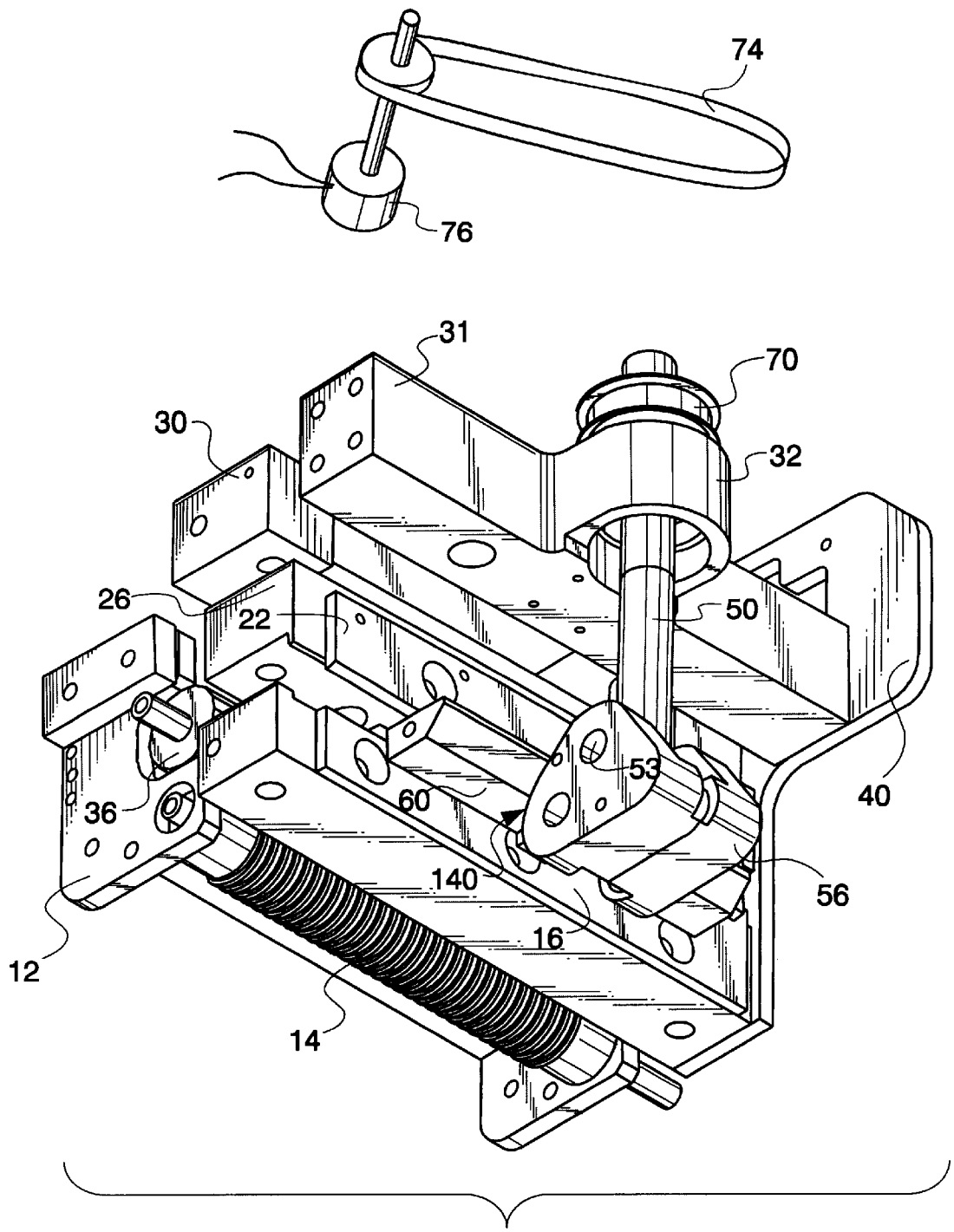
FIG. 2 is another fragmentary exploded perspective view of apparatus according to principles of the present invention.
Figure 3:
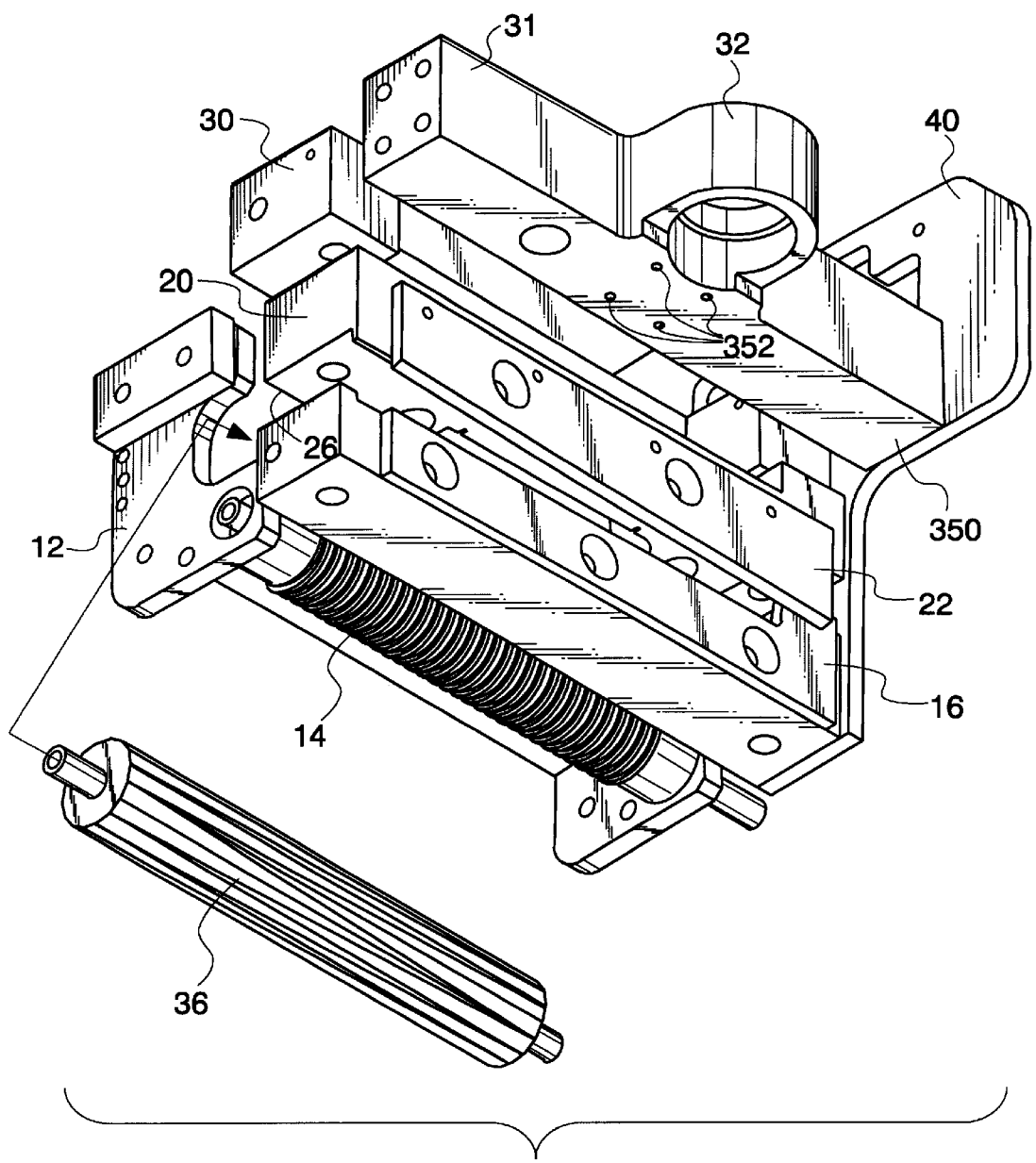
FIG. 3 is a further fragmentary exploded perspective view of apparatus according to principles of the present invention, showing assembly of the feed rollers.
Figure 4A:
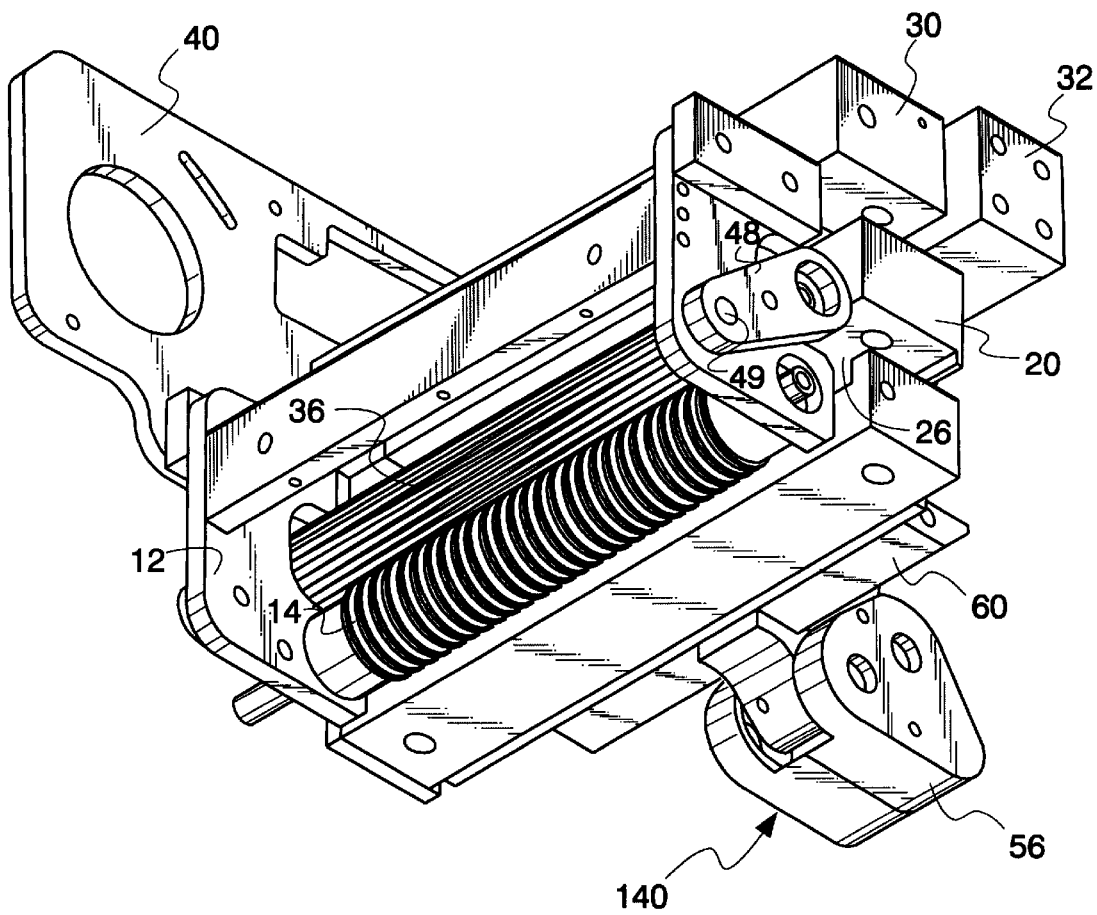
FIGS. 4a and 4b show the apparatus without and with a drive motor and transmission assembly, respectively.
Figure 4B:
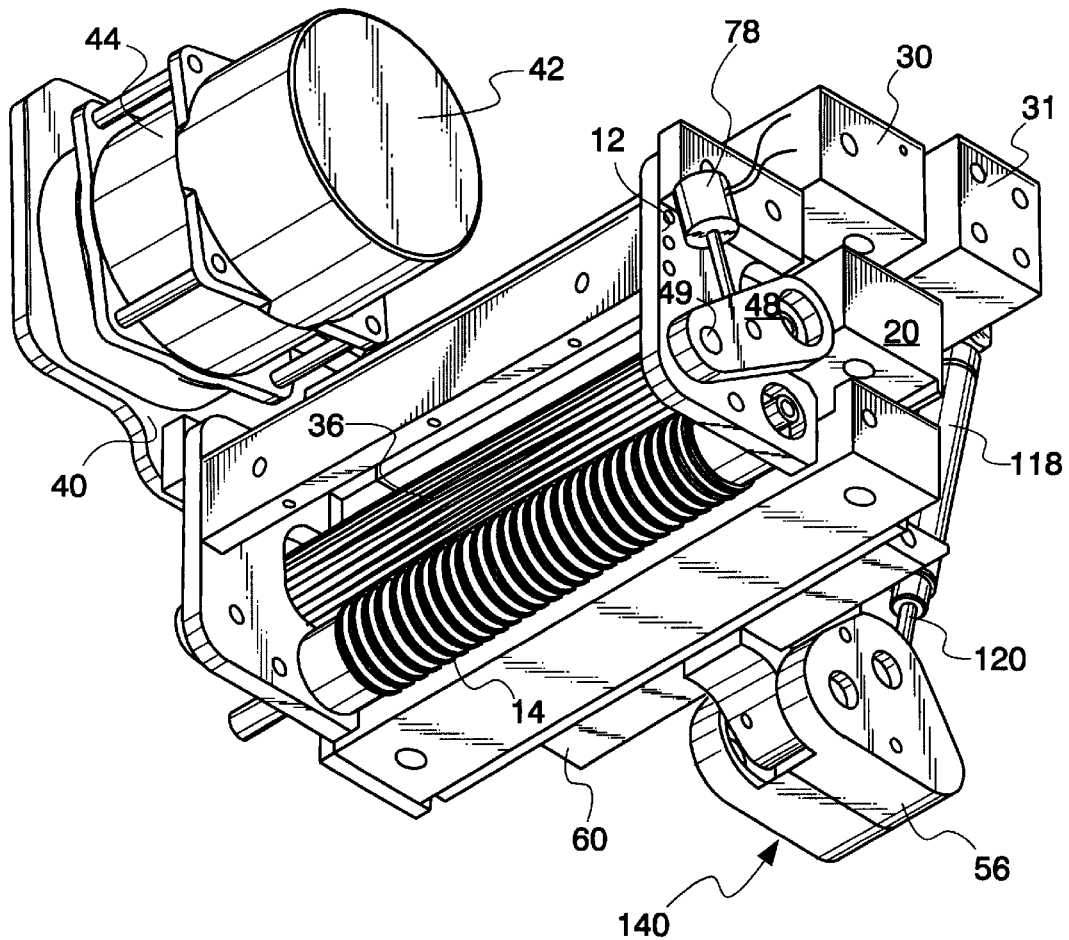

Referring now to FIGS. 1–6d, a first embodiment of valve placement apparatus is generally indicated at 10. Referring to FIGS. 1–3, a lower body portion 12 contains a roller 14 having circular guide edges, and also carries a cutting blade 16. An intermediate body portion 20 provides a guide surface 21 for a cutting blade 22. A passageway 26 is formed between the lower and intermediate body members 12, 20. An upper body member 31 includes a socket portion 32. A second feed roller 36 having longitudinally extending guide edges is mounted between the lower and intermediate body portions 12, 20. The body portions are secured to a mounting plate 40 which also carries a drive motor 42, gear transmission 44 (see FIG. 4b). Referring to FIG. 4, feed roller 36 is mounted for movement toward and away from feed roller 14 by a mounting plate 48, pivotally secured at 49 to lower body member 12.

Apparatus 10 includes a shuttle mechanism generally indicated at 140, having principal or main operating shaft 50 with an upper driven end passing through collar portion 32 and a lower free end secured to a cross shaft 52. Cross shaft 52 pivotally supports clevis 56, which supports a carrier or vacuum platen 60. As seen for example in FIG. 1, vacuum platen 60 includes a plurality of apertures 62, and a continuous passageway is formed in cross shaft 52 and main shaft 50 to a vacuum source connected to an opening 64 in the upper end of main shaft 50.

A belt pulley 70 is attached to the upper end of main shaft 50 and is driven by timing belt 74, which is in turn driven by a pneumatic rotary actuator, electric motor or other drive source 76 (see FIG. 2) mounted to the upper body portion (by means not shown).

Figure 5:
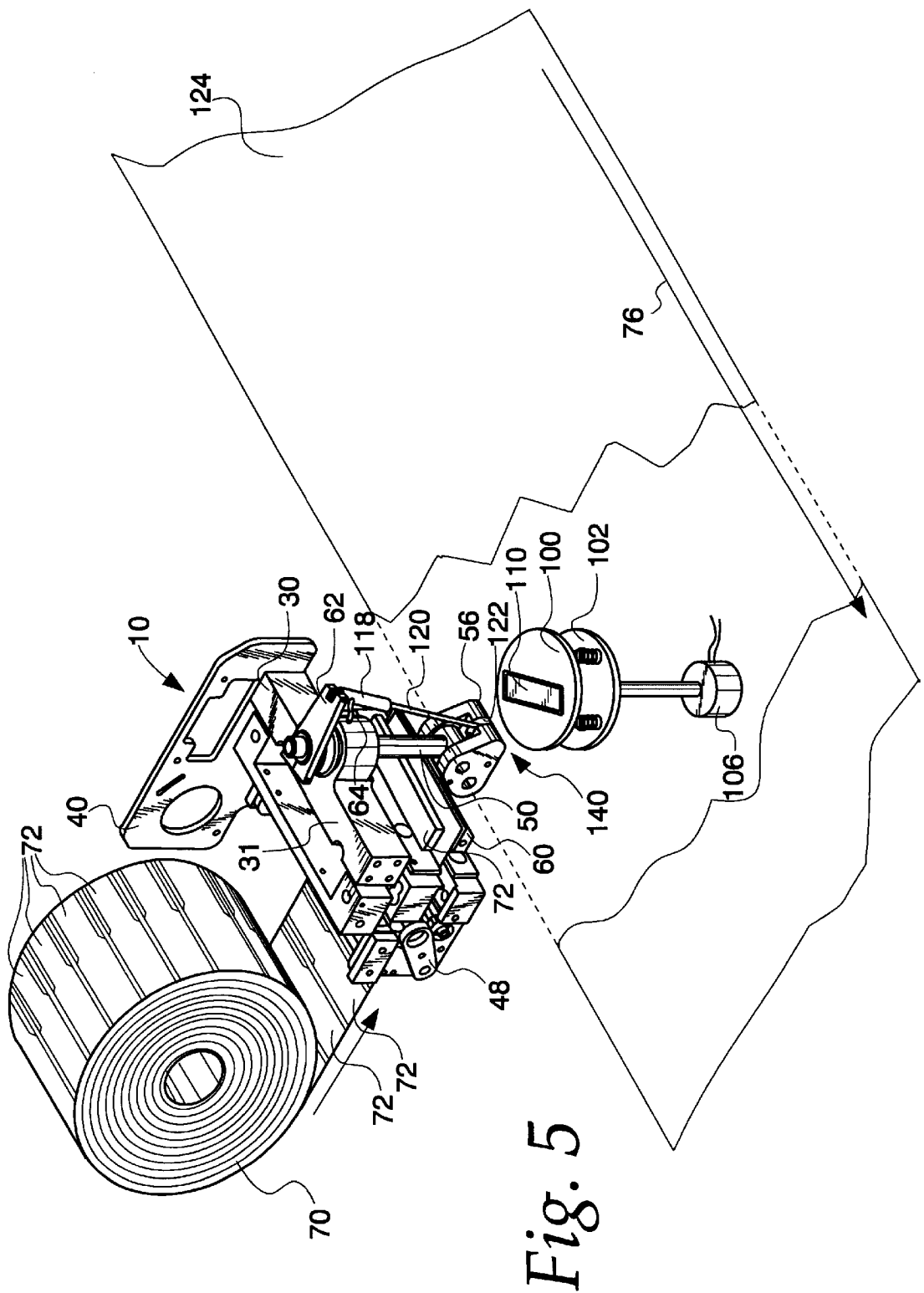
FIG. 5 is a perspective of the completed apparatus, but with the drive motor and transmission removed for clarity in the drawing.

Referring to FIGS. 4b and 5, shuttle mechanism 140 further includes an air cylinder 118 has a lower end pivotally connected to clevis 56 and an upper end secured by bracket 62 to the upper body portion 30. Air cylinder 118 is connected through tubing 64 to a vacuum source (not shown). The air cylinder 118 includes an actuator rod 120 having a lower end received in a slot 122 and clevis 56 (see FIG. 5) o The lower end of actuator rod 120 is pivotally connected to clevis 56 and, as will be seen, travels over a range of motion sufficient to cooperate with a gear mechanism in clevis 56 to invert the vacuum platen 60. When the air cylinder 118 is energized, actuator rod 120 is retracted within the air cylinder, applying a tension force to the pivotal connection between the air cylinder and clevis, and thereby causing vacuum platen 60 to rotate about the axis of cross shaft 52, resulting in the movement between the positions shown in FIGS. 6a and 6b. The slot 122 of clevis 56, as mentioned, receives the lower end of actuator rod 120 and allows the rod to travel over a range of motion sufficient to invert the vacuum platen as the vacuum show is rotated as much as 180° about the inverting axis. The central longitudinal axis of cross shaft 52, as will be seen herein, comprises an inverting axis associated with inverting of the vacuum platen.

Figure 6A:
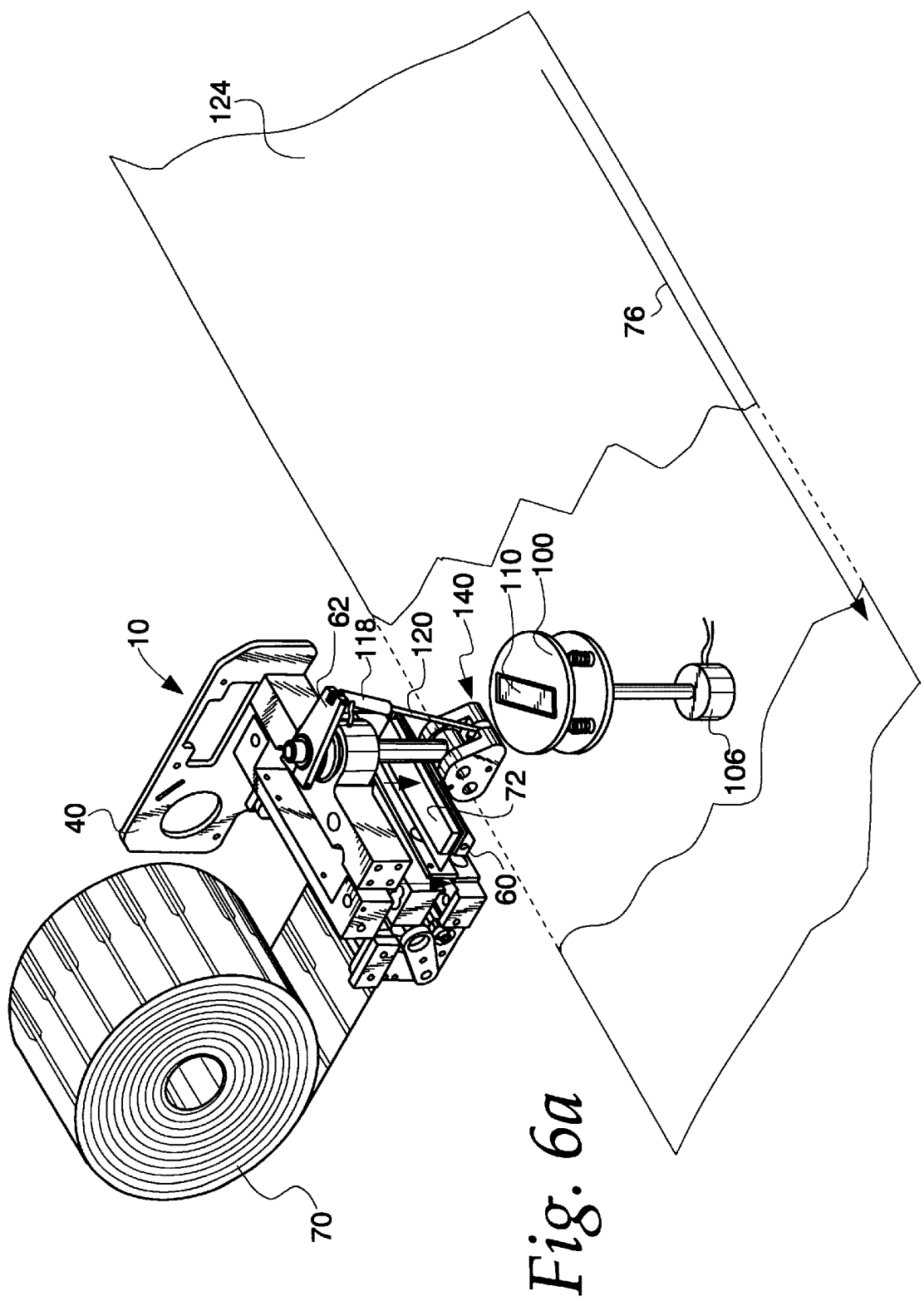
Figure 6C:
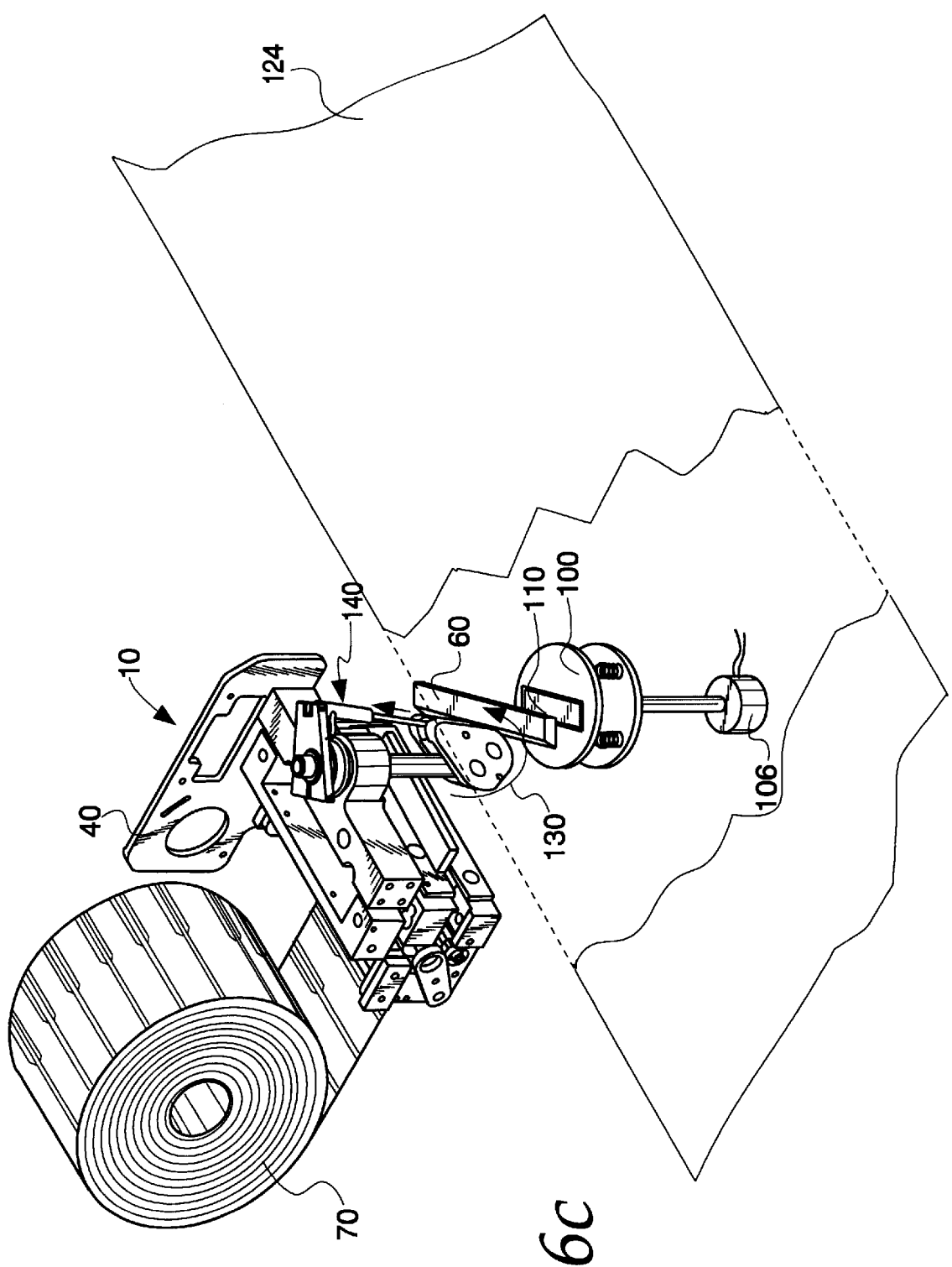
Figure 6D:
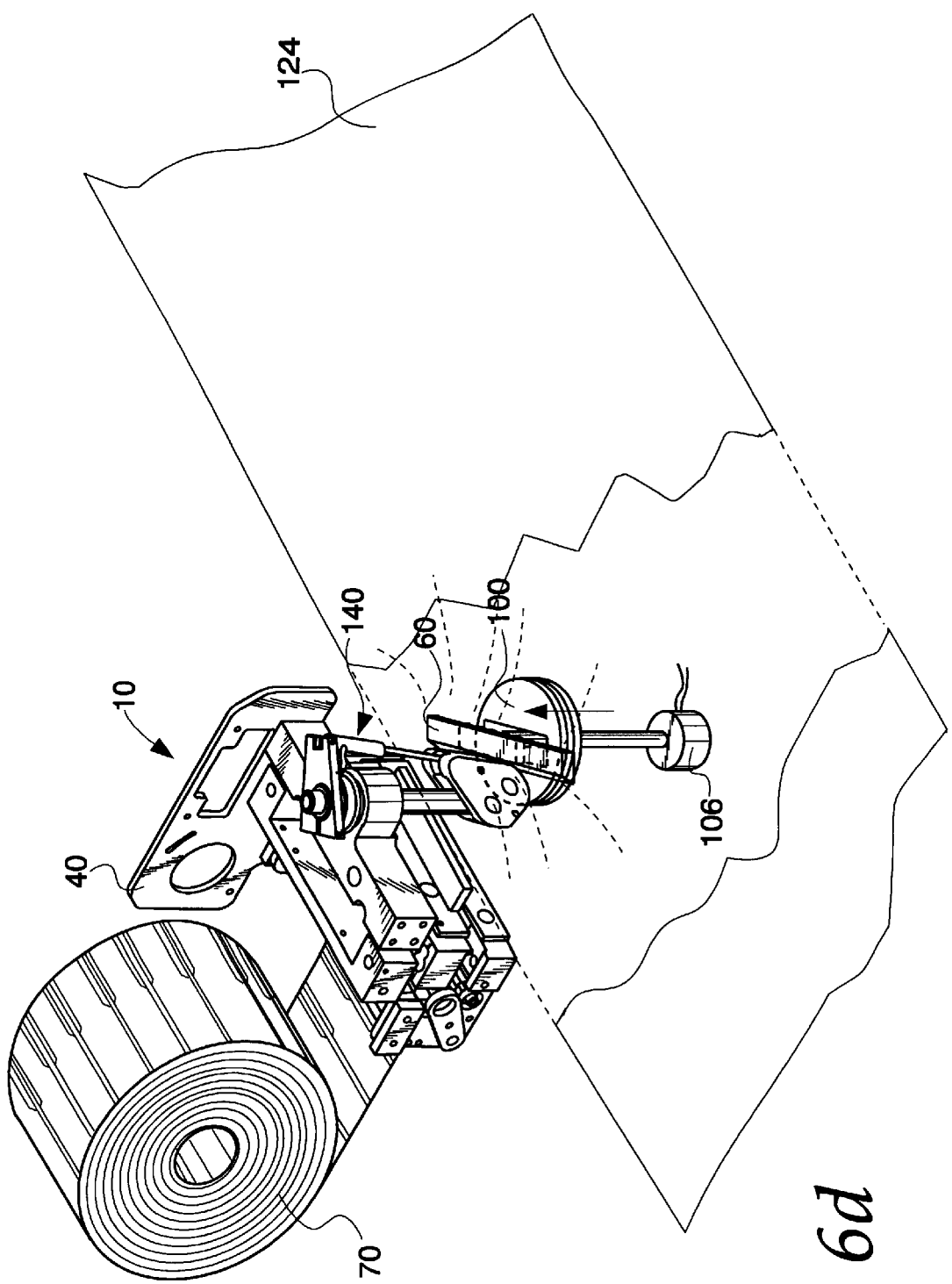

When motor 76 is energized, main shaft 50 is rotated about its central axis, resulting in the motion taking place between FIGS. 6b and 6c. The main shaft 50, which, as mentioned, is rotatably mounted in socket portion 32 so as to rotate about the longitudinal axis of the main shaft, provides an arrangement for altering the angular position of vacuum platen 60. Accordingly, the vacuum platen 60 is made to undergo a displacement caused by rotation about an angular positioning axis located along the longitudinal axis of main shaft 50 and rotation about an inverting axis lying along the longitudinal central axis of cross shaft 52. These combinations of motions can be seen with reference to FIGS. 6a–6c.

Referring to FIG. 5, a plurality of valve members 72 are joined together in a serial succession to form a continuous strip which is rolled to provide a supply roll 70. As will be seen herein, the apparatus of the present invention severs individual valve members from the roll so as to acquire valve members, one at a time, placing the valve members in a predefined position on a web 124 (see FIG. 5).

Upon loading a new roll of valves, solenoid 78 (see FIG. 4b) is actuated to cause mounting plate 48 to pivot about shaft 49, causing the feed rollers 36, 14 to separate. The roll of valves is inserted between the feed rollers, with the free end passing through passageway 26, and extending beyond cutting blades, 22, 16. The output shaft of motor 42 is connected to the upper feed roll 36 by a timing belt (not shown) to drive the webbing in a forward direction, beyond the cutting blade 22.

Preferably, the webbing is automatically indexed so as to align upper cutting blade 22 between serially adjacent valves. Referring to FIG. 1, a pair of connecting rods 80 are secured by welding or the like conventional means between the upper end of upper cutting blade 22 and actuator plate 82. A solenoid 84, carried by mounting head 86, is attached to the upper body part 30 by threaded fasteners 88, as indicated in FIG. 1. Coil springs 90 urge the connecting plate 82 (and hence the upper cutting blade 22) in an upward, or open position. Solenoid 84, when actuated through electrical conductors 92, pushes against connecting plate 82, lowering the cutting blade 22 in a scissors action with blade 16, severing a single valve from the leading end of the roll.

Preparatory to the cutting action, vacuum is drawn through openings 62 in platen 60. The severed valve is thereby maintained in position on platen 60, as indicated in FIG. 6a. Air cylinder 118 is then energized to invert platen 60 in the manner indicated in FIG. 6b, causing the valve to face in a downward direction. FIG. 6b shows a spring-loaded backing plate 100 resiliently carried on a table 102. The table is in turn mounted for movement in the direction of arrow 104 by actuation of solenoid 106. A heating member 110 is located in the exposed surface of plate 100.

Motor 76 is energized to move the main drive shaft 50 to the position illustrated in FIG. 6c, bringing platen 60 in registration with (but preferably spaced slightly above) the heating element 110. The solenoid 106 is then energized to raise plate 100, and accordingly web 76, in an upward direction, pressing the web 124 and the valve carried on platen 60 between the platen and heating element 110. The heating element 110 is then energized to at least tack bond the valve to the web 76. The motor 76 and air cylinder 60 are then energized to return the platen 60 to the "home" position illustrated for example in FIG. 1.

As can be seen from the above, the vacuum platen 60 is mounted for movement in three-dimensional space by an inverting means which inverts the vacuum platen by rotation along the inverting axis, as indicated by arrow 128 in FIG. 6b. Further, the vacuum platen undergoes movement by operation of angular positioning means which rotate about the central longitudinal axis of main shaft 50, as indicated by arrow 30 in FIG. 6c. The main shaft 50, cross shaft 52, clevis 56 and the associated driving mechanisms (including motor 76, belt 74 and air cylinder 118) cooperate together to mount the vacuum platen 60 in three dimensional space, to support the vacuum platen during a cutting operation and to move the vacuum platen, once loaded with an individual valve member, placing the valve member in position to receive a tack bond, while supporting the valve during the tack bonding process.

In the preferred embodiment, the valve film is cut in a scissors-like action as movable cutting blade 22 is advanced across the face of the lower permanently affixed blade 16. However, if desired, vacuum platen 60 could be aligned underneath the working edge of cutting blade 22, to provide a guillotine cutting action, if desired.

Turning now to FIGS. 7–13, a second embodiment of valve placement apparatus is generally indicated at 200. Many of the components of apparatus 200 are the same as those described above with reference to apparatus 10, shown in FIGS. 1–6d. For example, mounting plate 48 is provided for movement of feed roller 36. However, apparatus 200 employs an O-ring 202 which is fitted about pins 204 (mounted on plate 48) and 206 (mounted on lower body member 12) to provide a feed pressure for rolls 14, 36. A cutter subassembly generally indicated at 210 includes a mounting member 212 on which a pair of pneumatic actuators or solenoids 214 are mounted. The solenoids 214 move body member 20 and hence cutting blade 22 toward and away from cutting blade 16. The shuttle mechanism 140 is the same as that shown in FIG. 6b, for example.

Figure 7:
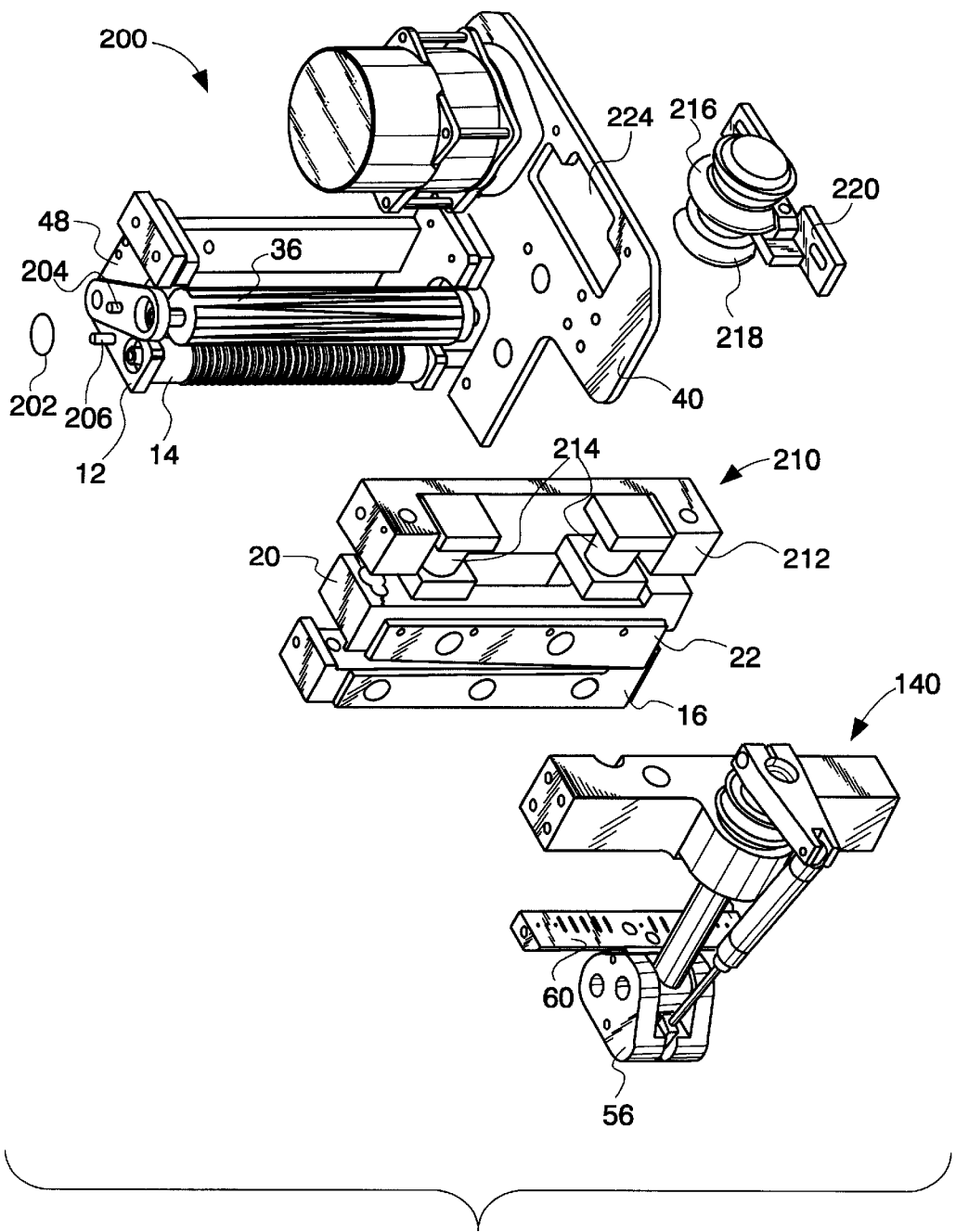
FIG. 7 is a partial exploded view of another embodiment of the apparatus.
Figure 8:
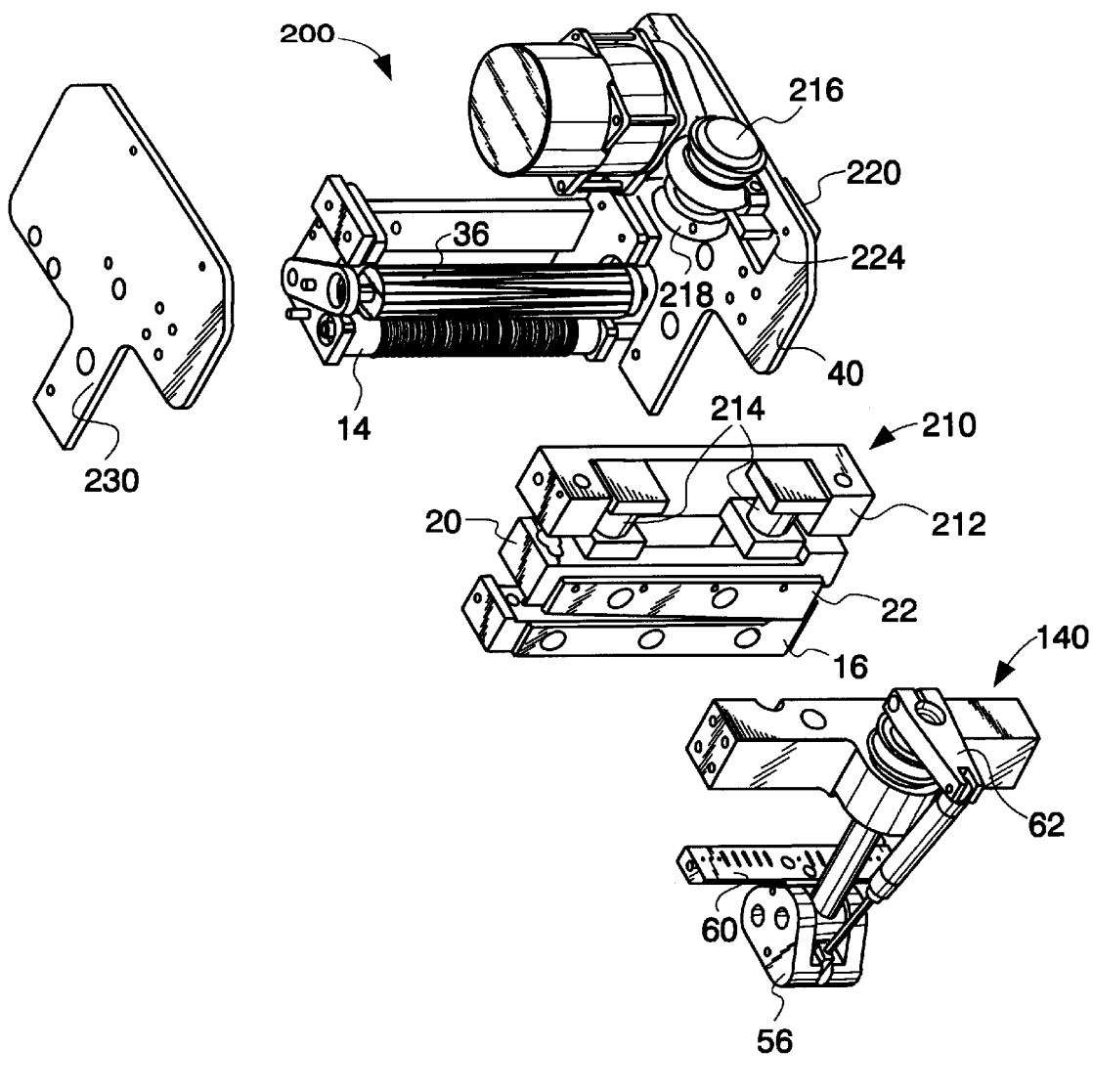
FIG. 8 is an exploded perspective view similar to that of FIG. 7 but showing further details regarding assembly of the apparatus.

As can be seen in the upper right corner of FIG. 7, a pneumatically operated rotary actuator 216 rotatively drives a pulley 218 mounted at its lower end. Actuator 216 is carried by a mounting plate 220. With additional reference to FIG. 8, mounting plate 220 is mounted to wall 40 adjacent an opening 224 which is formed in the wall. A second mounting wall 230 is shown. Wall 230 cooperates with wall 40 to mount the various subassemblies of the apparatus together.

Figure 9:
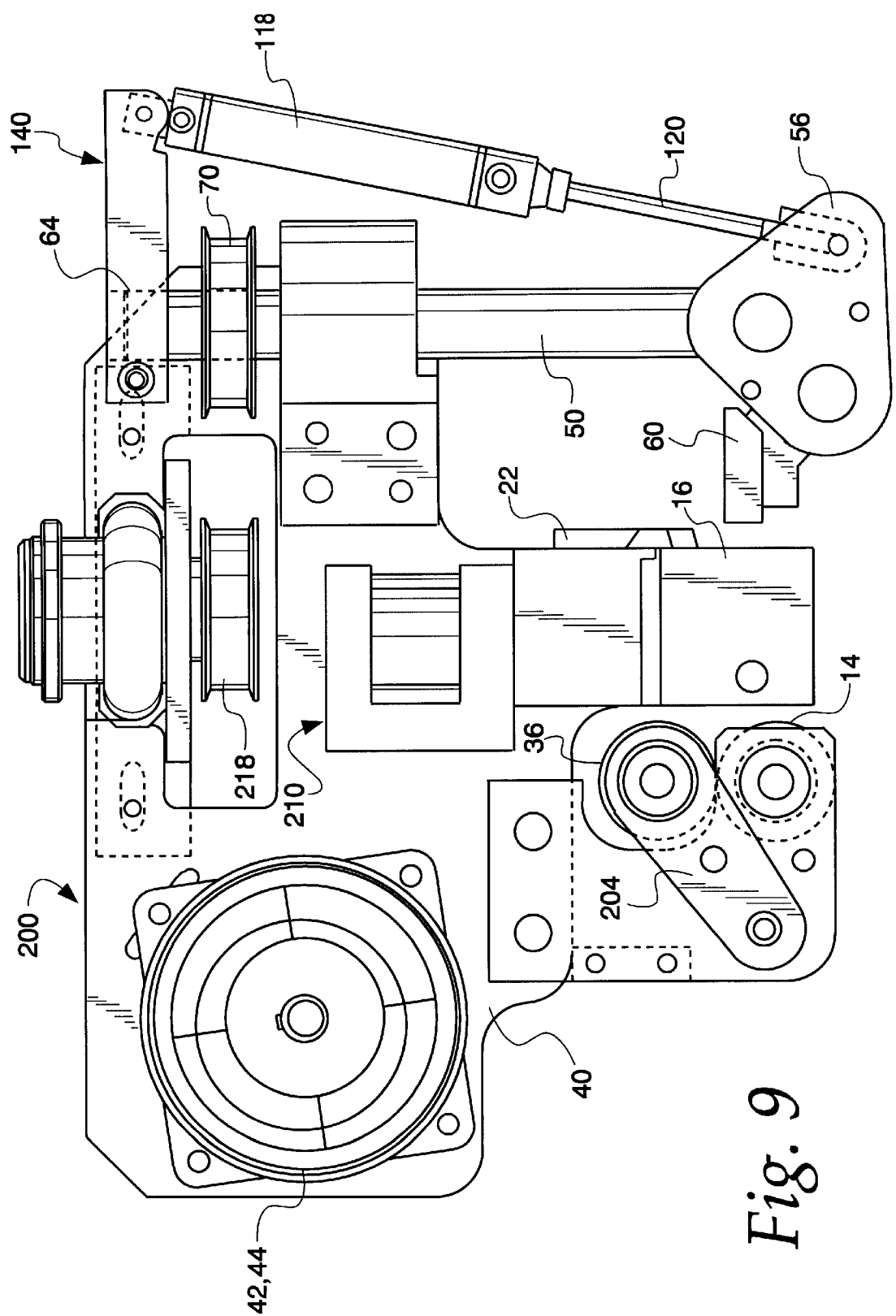
FIG. 9 is a side elevational view of the apparatus shown in FIG. 7, with one side plate removed.

Turning now to FIG. 9, apparatus 200 is shown with mounting wall 230 removed. As can be seen in the lower right corner of FIG. 9, and in FIGS. 11–13, a gear train is provided is clevis 56. Gear train includes a first gear 250 mounted for rotation with respect to shaft 50, and a second gear 252 secured to vacuum platen 60. The shaft 120 of air cylinder 118 is pinned at 254 to clevis 56, FIGS. 11–13 show the progression of gear 252 about gear 250, as shaft 120 is retracted within air cylinder 118. The gears 250, 252 and air cylinder 118 cooperate to provide a 180° rotational displacement of vacuum platen 60, and an associated rotation displacement of clevis 56 of approximately 90°. The position of the vacuum platen in FIG. 11 is the same as that shown, for example, in FIGS. 5 and 6a, ready to receive a valve member sheared from the supply roll by cutting blades 16, 22. With vacuum applied to platen 60 so as to firmly adhere the sealing valve thereto, air cylinder 118 is operated in the manner illustrated in FIGS. 11–13 so as to retract actuator rod 120 causing clevis 56 to rotate, with gear 252 traveling about gear 250. As can be seen in FIG. 13, the vacuum platen 60 is inverted with respect to its initial position (shown for example in FIGS. 5 and 11). The position of the vacuum platen in FIG. 13 corresponds to that shown in FIGS. 6b, 6c and 6d.

Figure 14:
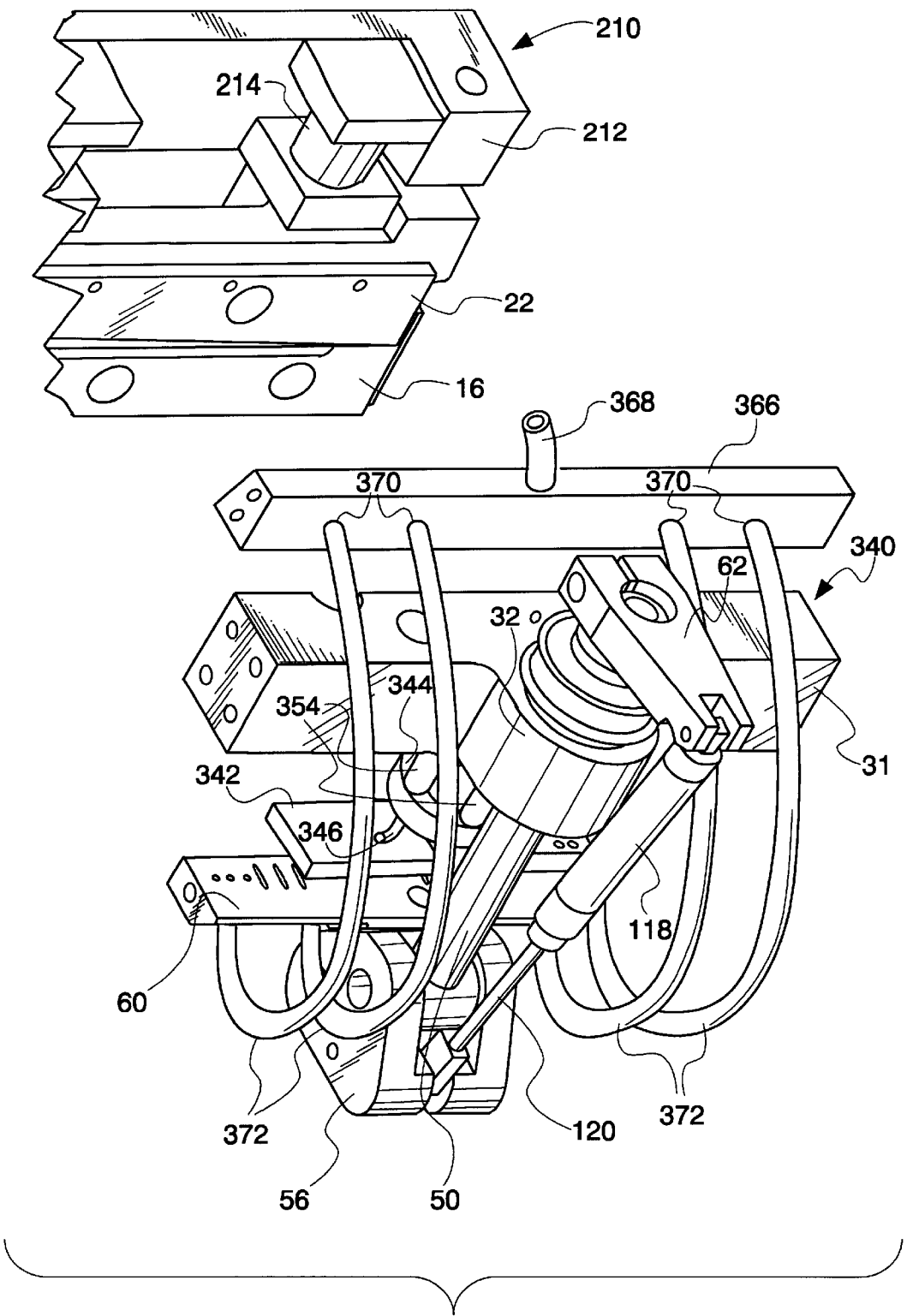
FIG. 14 is a fragmentary perspective view showing an alternative embodiment of the shuttle mechanism.

Referring now to FIG. 14, an alternative embodiment of the shuttle mechanism is generally indicated at 340. As will be seen herein, shuttle mechanism 340 contains many of the components of the aforedescribed shuttle mechanism 140. For example, the shaft 50, clevis 56, vacuum platen 60, air cylinder 118 and air cylinder shaft 120 are all present in the shuttle mechanism 340. Preferably, the same upper body member 31 is employed and the socket portion 32 of the body member 31 is also present in shuttle mechanism 340. As will be seen herein, the shuttle mechanism 340 provides improvements in maintaining positional control over a valve member to be sheared from a supply roll.

As mentioned previously, the shuttle mechanism 140 is arranged such that the vacuum platen 60 is disposed immediately adjacent the cutting blades 16, 22, and this feature is preferably present in the shuttle mechanism 340. The vacuum platen 60 is moved so as to underlie the free end of a supply roll to be sheared. Vacuum is applied to the platen 60; thus providing a control over the free end of the supply roll, maintaining the free end in a fixed position. As has been seen above, the free end of the supply roll, when separated from the major body portion of the supply roll, becomes a fully formed valve member.

Since the valve member is made of thin sheets of plastic having a large surface area with relatively little mass, the valve member could be subject to disturbances caused by surrounding air currents. In order to provide an additional measure of control over the formed valve member, a clamping plate 342 is provided and is positioned immediately above the working face of vacuum platen 60, when placed in the valve-receiving position (shown, for example, in FIG. 14). The valve-receiving position shown in FIG. 14 is the same as that shown in FIG. 5, for example. The clamping plate is supported by upper body member 31 and is mounted for movement toward and away from the working face of vacuum platen 60, i.e., away from and toward the upper body member 31, by an air cylinder 344.

Preferably, the air cylinder 344 is mounted to the underneath surface of upper body member 31. This underneath surface is shown in FIG. 3 and is identified by the reference numeral 350. As can be seen in FIG. 3, a series of mounting holes 352 are formed in the underneath surface 350 and receive threaded fasteners or the like extending through hollow mounting legs 354 of air cylinder 344, which are shown in FIG. 14. These screw fasteners secure air cylinder 344 to upper body member 31, allowing the air cylinder to develop clamping force in clamping plate 342, thus pressing the free end of the valve roll (and later, the valve member sheared from the remainder of the supply roll), against vacuum platen 60. This clamping force augments the vacuum force holding the valve member to the vacuum platen 60. The air cylinder 344 is actuated by air control signals in conduit 346.

In operation, the drive motor 42 for the feed rolls 14, 36, the air cylinder supply conduit 64 for air cylinder 118, the signals which drive pulley 70 (i.e., either signals to electric motor 76 or pneumatic signals to rotary actuator 216, the vacuum signals to vacuum platen 60 and the vacuum signals to air cylinder 344 are all under common control of a conventional controller apparatus. In operation, the drive motor 42 is energized to drive feed rolls 36, 14, moving a free end of the supply roll 70 past the cutting blades 16, 22, as shown for example in FIG. 5. The free end of the supply roll is thereby positioned over vacuum platen 60 and vacuum signals are applied to the vacuum platen to draw the free end of the supply roll. The air cylinder 344 is then actuated to draw clamping bar 342 against the valve member, clamping the valve member against vacuum platen 60. If desired, the air cylinder 344 can be actuated at the same time or before application of vacuum signal to vacuum platen 60.

The cutting blade 22 is then actuated to shear the free end of the supply roll, thereby forming a valve member (which, as mentioned, is clamped between clamping plate 342 and vacuum platen 60). The valve member is thereby held in secure position against any pinch effects or tension forces in the supply roll which might tend to move the free end of the supply roll from its desired position. For example, foreign matter may accumulate on the cutting blades or the cutting blades could become dull with use, so as to introduce a dislodging force to the free end of the supply roll before severing is eventually completed. Further, use of the clamping bar 342 allows the placement apparatus to accommodate a wide variety of web materials, without requiring the cutting blades to be changed. For example, tougher materials could be accommodated with the enhanced clamping provided by clamping bar 342. Also, some materials must be held very firmly in place during an impulsive cutting action so as to insure that virtually no movement of the valve member occurs during a shearing operation.

Turning again to FIG. 14, a vacuum manifold 366 has an outlet 368 and a number of inlets 370. The inlets 370 are coupled to vacuum platen 60 by flexible hoses 372. In a preferred embodiment, four hoses are provided and, if a greater vacuum force is required (i.e., a greater air flow volume), additional hoses can be provided. In the preferred embodiment, as can be seen in FIG. 14, the flexible hoses 372 are looped on either side of clevis 56. Preferably, the hoses are made of semirigid material which maintain their shape, insuring that the hosing remains free of any pinch points in the mechanism. If desired, helical spring overwraps could be provided at the upper ends of the hoses (those ends adjacent the vacuum manifold 366) if greater assurance against pinching is desired.

The present invention has found immediate commercial acceptance for use with placing self-sealing balloon valves on balloon films to provide significant advantages in the manufacture of toy balloon assemblies. However, it will be readily appreciated by those skilled in the art that the present invention could be used to acquire and place a wide variety of thin flexible members other than toy balloon valves, presenting the thin flexible members for joinder with a wide variety of webs other than balloon films.

For example, the apparatus could be used to acquire and place pressure-sensitive labels, such as bar code labels, for instance, on a traveling web such as a plastic film used in an automated wrapping process e for example. As a further alternative, the apparatus according to principles of the present invention could be used in the fabrication of adhesive bandages, applying absorbent pads to a webbing which is coated with a self adhesive and which is subsequently die cut to form a self-adhesive strip for applying the absorbent pad to a wound.

As can be seen from the above, the present invention provides an improved delivery of self-sealing valves, and other flexible members. The apparatus provides a series of self-sealing valves formed by cutting a supply roll. The valves, after a shearing operation, are moved in a three-dimensional spatial pattern by rotation about two different axes. With the arrangement of the present invention, the apparatus can be very compact, so that it may be placed in close proximity of other assemblies employed in a commercial manufacturing operation, such as the commercial manufacture of helium filled, metallized balloons. A fewer number of inexpensive parts are required, in part because the supply roll of valves is held stationary, and a sheared valve, taken from the end of the supply roll, only is moved in the required manner. The apparatus shown and described above was required only to invert the sealing valve being delivered. By employing other, conventional gear trains in clevis 56, the sealing, valve can be moved through virtually any desired angle.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Apparatus for acquiring and placing a thin flexible member, comprising:
   holding means for holding a strip of thin flexible members joined in a serial succession to form a continuous strip having a free end;
   a cutting station adjacent the holding means;
   feeding means adjacent the cutting station, for feeding the free end of the strip to the cutting station;
   cutting means at the cutting station adjacent the feeding means, for cutting a member at the free end of the strip from the remainder of the strip;
   carrier means at the cutting station, having a generally planar support surface for supporting the member at the free end of the strip, and for retaining the member after cutting; and
   carrier mounting means for rotatingly mounting the carrier;
   positioning means for rotational displacing movement of the carrier means about a first axis, generally parallel to the plane of the support surface, between a cutting support position for supporting the member at the free end of the strip and a delivery position, remote from the cutting support position, for placing the member in a predefined position.

2. The apparatus of claim 1 wherein the positioning means includes an inverting means which rotates the carrier along a second, inverting axis to substantially invert the carrier when moving the carrier between cutting support and delivery positions.

3. The apparatus of claim 1 wherein the carrier means surface includes vacuum ports extending to the support surface for engaging the thin flexible member with a vacuum.

4. The apparatus of claim 1 wherein the cutting means comprises a cutting blade linearly movable toward and away from the strip and the carrier in the cutting support position cooperates with the cutting blade to sever the member at the free end of the strip.

5. The apparatus of claim 1 wherein the feeding means comprises a pair of feed rollers located between the holding means and the cutting station, which are rotatively driven so as to feed the free end of the strip between the feed rollers to the cutting station.

6. The apparatus of claim 1 wherein the feed rollers are movable toward and away from each other to engage the strip and to allow the strip to be inserted therebetween, respectively.

7. The apparatus of claim 2 wherein the positioning means comprises a rotatably driven principal shaft having a first driven end and a second free end for supporting the carrier and the inverting means rotatively couples the carrier to the principal shaft.

8. The apparatus of claim 7 wherein the inverting means comprises a linear actuator supported by the principal shaft and has a linear actuator rod with a free end rotatively coupled to the carrier.

9. The apparatus of claim 8 wherein the carrier is coupled to the actuator rod through a gear train so that, as the actuator rod travels over its range of motion, the carrier is rotated approximately 180 degrees about the inverting axis.

10. The apparatus of claim 9 wherein the carrier defines a rod-receiving slot to allow the actuator rod to travel into and out of the slot as the actuator rod travels along its range of motion.

11. Apparatus for acquiring and placing a thin flexible member, comprising:
    holding means for holding a strip of thin flexible members joined in a serial succession to form a continuous strip having a free end;
    a cutting station adjacent the holding means;
    feeding means adjacent the cutting station, for feeding the free end of the strip to the cutting station;
    cutting means at the cutting station adjacent the feeding means, for cutting a member at the free end of the strip from the remainder of the strip;
    carrier means at the cutting station for supporting the member at the free end of the strip, and for retaining the member after cutting; and
    carrier mounting means for mounting the carrier for movement between a cutting support position for supporting the member at the free end of the strip and a delivery position, remote from the cutting support position, for placing the member in a predefined position; and
    inverting means for rotating the carrier along an inverting axis to substantially invert the carrier when moving the carrier between cutting support and delivery positions.

12. The apparatus of claim 11 wherein the carrier mounting means further comprises angular positioning means for rotating the member-engaging surface about an angular positioning axis which is offset with respect to the inverting axis.

13. The apparatus of claim 11 wherein the carrier has a generally planar member-engaging surface with vacuum ports extending to the member-engaging surface for engaging the thin flexible member with a vacuum.

14. The apparatus of claim 11 wherein the cutting means comprises a cutting blade linearly movable toward and away from the strip and the carrier in the cutting support position cooperates with the cutting blade to sever the member at the free end of the strip.

15. The apparatus of claim 11 wherein the feeding means comprises a pair of feed rollers located between the holding means and the cutting station, which are rotatively driven so as to feed the free end of the strip between the feed rollers to the cutting station.

16. The apparatus of claim 11 wherein the feed rollers are movable toward and away from each other to engage the strip and to allow the strip to be inserted therebetween, respectively.

17. The apparatus of claim 12 wherein the angular positioning means comprises a rotatably driven principal shaft having a first driven end and a second free end for supporting the carrier and the inverting means rotatively couples the carrier to the principal shaft.

18. The apparatus of claim 17 wherein the inverting means comprises a linear actuator supported by the principal shaft and has a linear actuator rod with a free end rotatively coupled to the carrier.

19. The apparatus of claim 18 wherein the carrier is coupled to the actuator rod through a gear train so that, as the actuator rod travels over its range of motion, the carrier is rotated approximately 180 degrees about the inverting axis.

20. The apparatus of claim 19 wherein the carrier defines a rod-receiving slot to allow the actuator rod to travel into and out of the slot as the actuator rod travels along its range of motion.

* * * * *